United States Patent
Yamada et al.

(10) Patent No.: US 9,522,987 B2
(45) Date of Patent: Dec. 20, 2016

(54) POLYBUTYLENE TEREPHTHALATE RESIN COMPOSITION AND HYDROLYSIS RESISTANCE-IMPROVING AGENT

(71) Applicant: WINTECH POLYMER LTD., Tokyo (JP)

(72) Inventors: Shinya Yamada, Fuji (JP); Kouichi Sakata, Fuji (JP); Kazuya Goshima, Fuji (JP)

(73) Assignee: WINTECH POLYMER LTD., Tokyo (JP)

(*) Notice: Subject to any disclaimer, the term of this patent is extended or adjusted under 35 U.S.C. 154(b) by 0 days.

(21) Appl. No.: 14/400,532

(22) PCT Filed: Mar. 14, 2013

(86) PCT No.: PCT/JP2013/057290
§ 371 (c)(1),
(2) Date: Nov. 11, 2014

(87) PCT Pub. No.: WO2013/179726
PCT Pub. Date: Dec. 5, 2013

(65) Prior Publication Data
US 2015/0126658 A1   May 7, 2015

(30) Foreign Application Priority Data
May 31, 2012 (JP) ................. 2012-125030

(51) Int. Cl.
*C08K 5/11* (2006.01)
*C08K 5/103* (2006.01)
*C08K 5/29* (2006.01)

(52) U.S. Cl.
CPC ............. *C08K 5/11* (2013.01); *C08K 5/103* (2013.01); *C08K 5/29* (2013.01)

(58) Field of Classification Search
CPC ........... C08K 5/29; C08K 5/053; C08K 5/103; C08L 67/02
(Continued)

(56) References Cited

U.S. PATENT DOCUMENTS 5,258,434 A    11/1993  Hanabusa
2008/0139715 A1  6/2008  Scherzer
(Continued)

FOREIGN PATENT DOCUMENTS

CN    101622310 A    1/2010
CN    102056987 A   11/2011
(Continued)

OTHER PUBLICATIONS

Machine translation of JP 06184410. Jul. 1994.*
(Continued)

*Primary Examiner* — John Uselding
(74) *Attorney, Agent, or Firm* — Knobbe, Martens, Olson & Bear LLP

(57) ABSTRACT

Provided is a means for obtaining a polybutylene terephthalate resin composition that exhibits excellent hydrolysis resistance and high fluidity in a molten state. A carbodiimide compound (B) and a polyhydric hydroxyl group-containing compound (C) are added to a polybutylene terephthalate resin (A) having a terminal carboxyl group content of 30 meq/kg or lower. The polyhydric hydroxyl group-containing compound (C) that is used has a hydroxyl group value of 200 or higher. It is preferable for the polybutylene terephthalate resin (A) to have an intrinsic viscosity of 0.6 dL/g or higher.

5 Claims, 1 Drawing Sheet

(58) Field of Classification Search
USPC .......................................................... 524/195
See application file for complete search history.

(56) References Cited

U.S. PATENT DOCUMENTS

| | | | |
|---|---|---|---|
| 2010/0093888 A1 | 4/2010 | Endo et al. | |
| 2010/0209646 A1 | 8/2010 | Yamada | |
| 2011/0092626 A1 | 4/2011 | Sakata | |
| 2012/0309889 A1* | 12/2012 | Weber et al. | 524/504 |
| 2015/0051324 A1 | 2/2015 | Nonokawa et al. | |
| 2016/0204337 A1* | 7/2016 | Tanimoto | B32B 27/36 |
| | | | 428/355 AC |

FOREIGN PATENT DOCUMENTS

| | | |
|---|---|---|
| EP | 2832795 A1 | 2/2015 |
| JP | H04-120162 | 4/1992 |
| JP | 4-351657 | 7/1992 |
| JP | H06-184410 | 7/1994 |
| JP | H09-124908 | 5/1997 |
| JP | 2000-35509 | 2/2000 |
| JP | 2008-530256 | 7/2008 |
| JP | 2009-173857 | 8/2009 |
| JP | 2009-298827 | 12/2009 |
| WO | WO2009/050859 | 4/2009 |
| WO | WO2009/150830 | 12/2009 |
| WO | 2013/146625 A1 | 10/2013 |

OTHER PUBLICATIONS

Extended European Search Report dated Nov. 20, 2015 of corresponding European Patent Application No. 13796901.0—10 pages.
Office Action for Chinese Patent Application No. 201380028697.7 dated Sep. 5, 2016—9 pages.

* cited by examiner

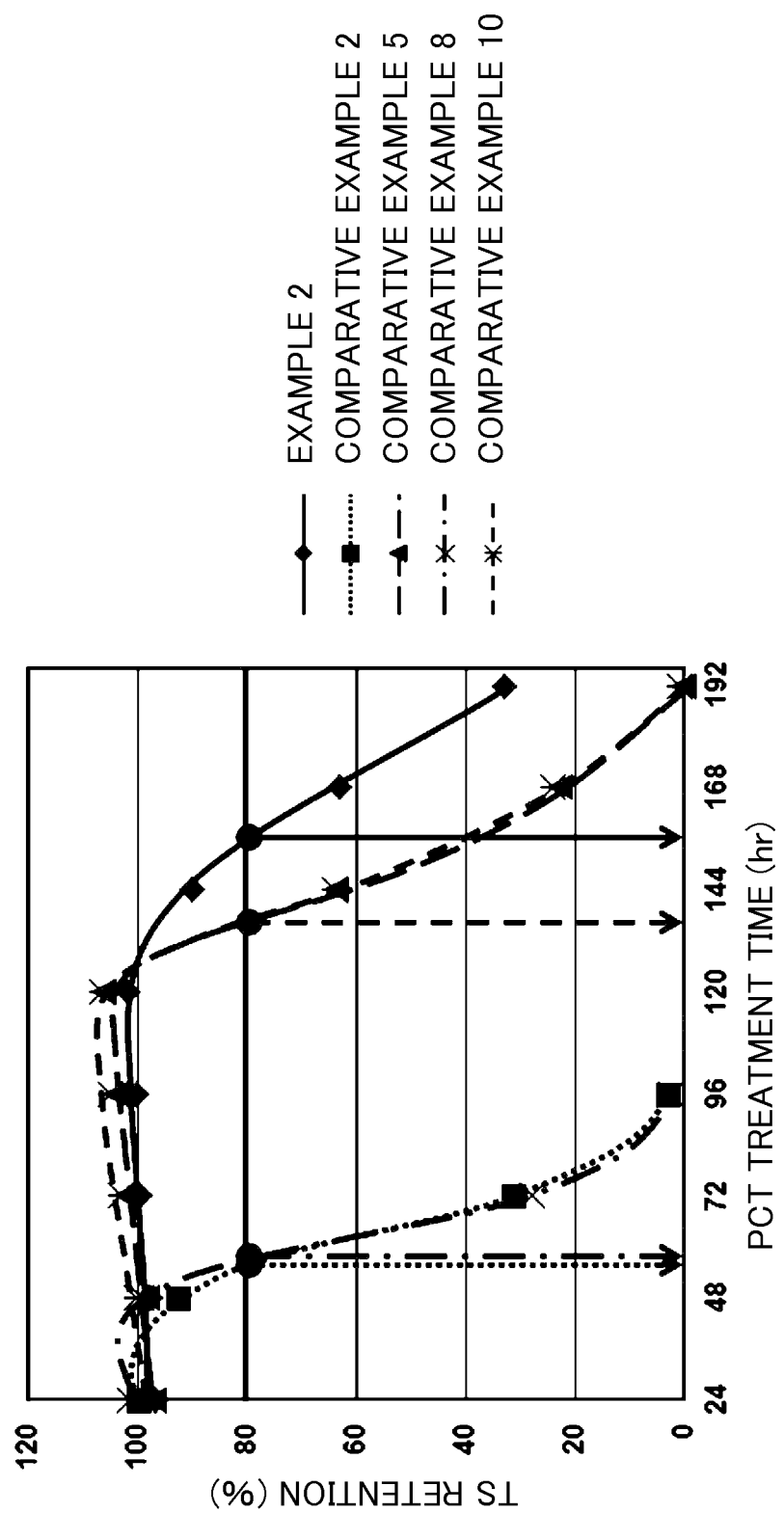

POLYBUTYLENE TEREPHTHALATE RESIN COMPOSITION AND HYDROLYSIS RESISTANCE-IMPROVING AGENT

TECHNICAL FIELD

The present invention relates to a polybutylene terephthalate resin composition having excellent hydrolysis resistance and high fluidity and relates to a hydrolysis resistance-improving agent increasing the hydrolysis resistance of the polybutylene terephthalate resin composition.

BACKGROUND ART

Polybutylene terephthalate resins have excellent mechanical characteristics, electrical characteristics, heat resistance, weather resistance, water resistance, chemical resistance, and solvent resistance and are therefore widely used as engineering plastics in various uses, such as automobile parts and electric and electronic parts.

However, the polybutylene terephthalate resins have a problem of low hydrolysis resistance and do not necessarily have sufficient durability to be used in high temperature and high humidity environment.

Accordingly, improvement in the hydrolysis resistance of a polybutylene terephthalate resin composition has been investigated from the aspect of raw materials. For example, Patent Document 1 discloses a polybutylene terephthalate resin composition comprising a polybutylene terephthalate resin, a carbodiimide compound, and a fibrous filler. According to Patent Document 1, the resin composition described in Patent Document 1 has high strength and excellent heat shock resistance and also shows high tensile strength retention (hydrolysis resistance) after a pressure cooker test. However, the resin composition described in Patent Document 1 has a problem of an increase in viscosity due to a reaction between the polybutylene terephthalate resin and the carbodiimide compound. In addition, according to examples of Patent Document 1, the addition of a fatty acid ester to the composition can slightly increase the fluidity, but deteriorates the hydrolysis resistance.

It is also known that the fluidity of a resin composition during molding can be improved by adding a fluidity-improving agent to a polybutylene terephthalate resin. For example, Patent Document 2 discloses a polybutylene terephthalate resin composition having excellent fluidity by containing a glycerin fatty acid ester therein. In this Document, no technology of improving hydrolysis resistance has been found.

Patent Document 1: PCT International Application, Publication No. 2009/150830

Patent Document 2: PCT International Application, Publication No. 2009/050859

DISCLOSURE OF THE INVENTION

Problems to be Solved by the Invention

The present invention has been made in order to solve the problems described above, and the object of the present invention is to provide a technology of preparing a polybutylene terephthalate resin composition having excellent hydrolysis resistance and also high fluidity in a molten state.

Means for Solving the Problems

The present inventors have diligently studied for solving the problems described above. As a result, the inventors have found that a polybutylene terephthalate resin composition comprising a carbodiimide compound and a specific polyhydroxy group-containing compound can improve the hydrolysis resistance of the resin composition, while increasing the fluidity of the resin composition, and have accomplished the present invention.

More specifically, the present invention provides the followings:

(1) A polybutylene terephthalate resin composition comprising:
a polybutylene terephthalate resin (A) having a terminal carboxyl group amount of 30 meq/kg or less;
a carbodiimide compound (B); and
a polyhydroxy group-containing compound (C) having a hydroxyl group value of 200 or more;

(2) The polybutylene terephthalate resin composition according to aspect (1), wherein the polybutylene terephthalate resin (A) has an intrinsic viscosity of 0.6 dL/g or more;

(3) The polybutylene terephthalate resin composition according to aspect (1) or (2), wherein, in case the amount of a terminal carboxyl group of the polybutylene terephthalate resin (A) is 1 equivalent, the amount of the carbodiimide compound (B) is contained in the polybutylene terephthalate resin composition such that the amount of the carbodiimide functional groups is 0.5 to 10 equivalents;

(4) The polybutylene terephthalate resin composition according to any one of aspects (1) to (3), wherein the polyhydroxy group-containing compound (C) has an ester bond with a fatty acid having 12 or more carbon atoms;

(5) The polybutylene terephthalate resin composition according to any one of aspects (1) to (4), wherein the content of the polyhydroxy group-containing compound (C) is 0.05 to 5 parts by mass based on 100 parts by mass of the polybutylene terephthalate resin (A);

(6) The polybutylene terephthalate resin composition according to any one of aspects (1) to (5), further comprising:
an inorganic filler (D); and (7) A hydrolysis resistance-improving agent for improving the hydrolysis resistance of a polybutylene terephthalate resin composition by being mixed with a polybutylene terephthalate resin together with a carbodiimide compound or being mixed with a polybutylene terephthalate resin before addition of a carbodiimide compound to the polybutylene terephthalate resin,
wherein the hydrolysis resistance-improving agent comprises a polyhydroxy group-containing compound having a hydroxyl group value of 200 or more.

Effects of the Invention

The present invention can provide a polybutylene terephthalate resin composition having excellent hydrolysis resistance and high fluidity in a molten state.

BRIEF DESCRIPTION OF THE DRAWINGS

FIG. 1 is a graph showing approximate curves obtained from the results of examples and comparative examples by plotting the TS retention on the vertical axis and the treatment time on the horizontal axis.

PREFERRED MODE FOR CARRYING OUT THE INVENTION

Embodiments of the present invention will now be described in detail. The present invention is not limited to the following embodiments.

The polybutylene terephthalate resin composition of the present invention includes a polybutylene terephthalate resin (A), a carbodiimide compound (B), and a polyhydroxy group-containing compound (C). The polyhydroxy group-containing compound (C) is the hydrolysis resistance-improving agent of the present invention. Each component contained in the polybutylene terephthalate resin composition will now be described.

[Polybutylene Terephthalate Resin (A)]

The polybutylene terephthalate resin (A) is a thermoplastic resin of which polymerization components are at least terephthalic acid (terephthalic acid or its ester-forming derivative) and alkylene glycol having 4 carbon atoms (1,4-butanediol) or its ester-forming derivative. The polybutylene terephthalate resin (A) has a terminal carboxyl group amount of 30 meq/kg or less, as described below.

Examples of the polybutylene terephthalate resin (A) (PBT resin) as the base resin include homopolyesters (polybutylene terephthalate) composed of repeating units derived from butylene terephthalate; and copolyesters (butylene terephthalate copolymers or polybutylene terephthalate copolyesters) mainly composed of repeating units derived from butylene terephthalate and including repeating units derived from copolymerizable monomers at the ratios described below.

Examples of the copolymerizable monomer (hereinafter, may be simply referred to as copolymerizable monomer) in the copolyester (a butylene terephthalate copolymer or a modified PBT resin) include dicarboxylic acid components excluding terephthalic acid, diols excluding 1,4-butanediol, oxycarboxylic acid components, and lactone components. These copolymerizable monomers may be used alone or in combination of two or more thereof.

Examples of the dicarboxylic acid (or dicarboxylic acid component or dicarboxylic acids) include aliphatic dicarboxylic acids (for example, $C_{4-40}$ dicarboxylic acids such as succinic acid, glutaric acid, adipic acid, pimelic acid, suberic acid, azelaic acid, sebacic acid, undecane dicarboxylic acid, dodecane dicarboxylic acid, hexadecane dicarboxylic acid, and dimer acid, preferably $C_{4-14}$ dicarboxylic acids); alicyclic dicarboxylic acid components (for example, $C_{8-12}$ dicarboxylic acids such as hexahydrophthalic acid, hexahydroisophthalic acid, hexahydroterephthalic acid, and himic acid); aromatic dicarboxylic acid components excluding terephthalic acid (for example, $C_{8-16}$ dicarboxylic acids such as phthalic acid, isophthalic acid, naphthalene dicarboxylic acids (such as 2,6-naphthalene dicarboxylic acid), 4,4'-diphenyldicarboxylic acid, 4,4'-diphenoxy ether dicarboxylic acid, 4,4'-diphenyl ether dicarboxylic acid, 4,4'-diphenylmethane dicarboxylic acid, and 4,4'-diphenyl ketone dicarboxylic acid); and reactive derivatives thereof (for example, $C_{1-4}$ alkyl esters of phthalic acid or isophthalic acid, such as lower alkyl esters (e.g., dimethyl phthalic acid or dimethyl isophthalic acid (DMI)), and ester-formable derivatives such as acid chlorides and acid anhydrides). Furthermore, a multivalent carboxylic acid, such as trimellitic acid or pyromellitic acid, or its ester-forming derivative (such as alcohol ester) may be also used as necessary. The use of the polyfunctional compound can provide also a branched polybutylene terephthalate resin.

Examples of the diol (or diol component or diols) include aliphatic alkane diols excluding 1,4-butanediol (for example, alkane diols (e.g., ethylene glycol, trimethylene glycol, propylene glycol, neopentyl glycol, lower alkane diols such as hexanediols (e.g., 1,6-hexanediol), octanediols (e.g., 1,3-octanediol and 1,8-octanediol), and decanediols, preferably linear or branched $C_{2-12}$ alkane diols, and more preferably linear or branched $C_{2-10}$ alkane diols); (poly)oxyalkylene glycols (e.g., glycol having a plurality of oxy $C_{2-4}$ alkylene units, such as diethylene glycol, dipropylene glycol, ditetramethylene glycol, triethylene glycol, tripropylene glycol, and polytetramethylene glycol)]; alicyclic diols (e.g., 1,4-cyclohexanediol, 1,4-cyclohexane dimethanol, and hydrogenated bisphenol A); aromatic diols [for example, dihydroxy $C_{6-14}$ arenes such as hydroquinone, resorcinol, and naphthalene diol; biphenols (such as 4,4'-dihydroxybiphenyl); bisphenols; and xylylene glycol], and reactive derivatives thereof (e.g., ester-forming derivatives such as alkyl, alkoxy, or halogen substitution products). Furthermore, a polyol, such as glycerin, trimethylolpropane, trimethylolethane, or pentaerythritol, or an ester-forming derivative thereof may be also used as necessary. The use of the polyfunctional compound can also provide a branched polybutylene terephthalate resin.

Examples of the bisphenols include bis(hydroxyaryl) $C_{1-6}$ alkanes, such as bis(4-hydroxyphenyl)methane (bisphenol F), 1,1-bis(4-hydroxyphenyl)ethane (bisphenol AD), 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, and 2,2-bis(4-hydroxyphenyl)-4-methylpentane; bis(hydroxyaryl) $C_{4-10}$ cycloalkanes, such as 1,1-bis(4-hydroxyphenyl)cyclopentane and 1,1-bis(4-hydroxyphenyl)cyclohexane; and 4,4'-dihydroxydiphenyl ether, 4,4'-dihydroxydiphenyl sulfone, 4,4'-dihydroxydiphenyl sulfide, 4,4'-dihydroxydiphenyl ketone, and alkylene oxide adducts thereof. Examples of the alkylene oxide adduct include $C_{2-3}$ alkylene oxide adducts of bisphenols (for example, bisphenol A, bisphenol AD, and bisphenol F), such as 2,2-bis[4-(2-hydroxyethoxyl)phenyl]propane, diethoxylated bisphenol A (EBPA), 2,2-bis[4-(2-hydroxypropoxyl)phenyl]propane, and dipropoxylated bisphenol A. The addition number of moles of the alkylene oxide ($C_{2-3}$ alkylene oxide such as ethylene oxide or propylene oxide) is about 1 to 10 moles, preferably about 1 to 5 moles, per hydroxy group.

Examples of the oxycarboxylic acid (or oxycarboxylic acid component or oxycarboxylic acids) include oxycarboxylic acids, such as oxybenzoic acid, oxynaphtoic acid, hydroxyphenylacetic acid, glycolic acid, and oxycaproic acid, and derivatives thereof. Examples of the lactone include $C_{3-12}$ lactones such as propiolactone, butyrolactone, valerolactone, and caprolactone (e.g., ε-caprolactone).

Among these copolymerizable monomers, preferred are diols [$C_{2-6}$ alkylene glycols (e.g., linear or branched alkylene glycols, such as ethylene glycol, trimethylene glycol, propylene glycol, and hexanediol), polyoxy $C_{2-4}$ alkylene glycols having about 2 to 4 repeating oxyalkylene units (such as diethylene glycol), bisphenols (bisphenols or alkylene oxide adducts thereof)], dicarboxylic acids [$C_{6-12}$ aliphatic dicarboxylic acids (such as adipic acid, pimelic acid, suberic acid, azelaic acid, and sebacic acid), asymmetric aromatic dicarboxylic acid having carboxyl groups substituting asymmetric positions of the arene ring, and 1,4-cyclohexane dimethanol].

The polybutylene terephthalate resin (A) is preferably a homopolyester (polybutylene terephthalate) and/or a copolymer (polybutylene terephthalate copolyester). The polybutylene terephthalate resin (A) may be a copolyester having a proportion (modification amount) of the copolymerizable monomer of 45 mol % or less (for example, about 0 mol % or more and 45 mol % or less), preferably 35 mol % or less (for example, about 0 mol % or more and 35 mol % or less), and more preferably 30 mol % or less (for example, about 0 mol % or more and 30 mol % or less).

The proportion of the copolymerizable monomer in the copolymer is, for example, in a range of about 0.01 mol % or more and 30 mol % or less, usually about 1 mol % or more and 30 mol % or less, preferably about 3 mol % or more and 25 mol % or less, and more preferably about 5 mol % or more and 20 mol % or less. In a case of using the homopolyester (polybutylene terephthalate) is used in combination with a copolymer (copolyester), the proportion of the copolymerizable monomer in the combination of the homopolyester and the copolyester is in a range of 0.1 mol % or more and 30 mol % or less (preferably, about 1 mol % or more and 25 mol % or less, more preferably about 5 mol % or more and 25 mol % or less) based on the total amount of the monomers. The ratio of the homopolyester to the copolyester is usually selected from a range of about 99/1 to 1/99 (mass ratio), preferably about 95/5 to 5/95 (mass ratio), and more preferably about 90/10 to 10/90 (mass ratio).

The terminal carboxyl group amount of the polybutylene terephthalate resin (A) is 30 meq/kg or less. More preferably, the terminal carboxyl group amount is 25 meq/kg or less. In the present invention, though the polybutylene terephthalate resin composition can increase the hydrolysis resistance by containing a carbodiimide compound (B) and a polyhydroxy group-containing compound (C), a too large number of the terminal carboxyl groups of the polybutylene terephthalate resin prevents the hydrolysis resistance of the polybutylene terephthalate resin composition from sufficiently increasing. Accordingly, the terminal carboxyl group amount of the polybutylene terephthalate resin (A) should be 30 meq/kg or less.

The polybutylene terephthalate resin (A) preferably has an intrinsic viscosity (IV) of 0.6 dL/g or more and more preferably 0.7 dL/g or more. The intrinsic viscosity is preferably 1.3 dL/g or less and more preferably 1.2 dL/g or less. An intrinsic viscosity of 0.6 to 1.3 dL/g may be achieved by mixing polybutylene terephthalate resins (A) having different intrinsic viscosities, for example, mixing a polybutylene terephthalate resin having an intrinsic viscosity of 1.5 dL/g and a polybutylene terephthalate resin having an intrinsic viscosity of 0.5 dL/g. The intrinsic viscosity (IV) can be measured in o-chlorophenol at a temperature of 35° C. The use of a polybutylene terephthalate resin having an intrinsic viscosity within such a range can readily and efficiently provide sufficient hydrolysis resistance and reduce the melting viscosity. A too small intrinsic viscosity has a risk of failing to sufficiently improve the hydrolysis resistance, whereas a too large intrinsic viscosity may increase the melting viscosity during molding to cause a risk of poor fluidity of the resin in a mold or a failure in filling a mold with the resin.

The polybutylene terephthalate resin (A) may be a commercially available one or may be produced by copolymerizing (polycondensing) terephthalic acid or its reactive derivative and 1,4-butanediol and an optional copolymerizable monomer by a common method such as transesterification or direct esterification.

[Carbodiimide Compound (B)]

The carbodiimide compound (B) used in the present invention is a compound having a carbodiimido group (—N=C=N—) in the molecule. The carbodiimide compound may be an aliphatic carbodiimide compound having an aliphatic main chain, an alicyclic carbodiimide compound having an alicyclic main chain, or an aromatic carbodiimide compound having an aromatic main chain, and preferred is an aromatic carbodiimide compound in light of hydrolysis resistance.

Examples of the aliphatic carbodiimide compound include diisopropylcarbodiimide, dioctyldecylcarbodiimide, di-tert-butylcarbodiimide, 1-ethyl-3-tert-butylcarbodiimide, 1-(2-butyl)-3-ethylcarbodiimide, 1,3-di-(2-butyl)carbodiimide, and poly(diisopropylcarbodiimide). Examples of the alicyclic carbodiimide compound include dicyclohexylcarbodiimide and poly(diisopropylcarbodiimide).

Examples of the aromatic carbodiimide compound include mono- or dicarbodiimide compounds, such as diphenylcarbodiimide, di-2,6-dimethylphenylcarbodiimide, di-2,6-diethylphenylcarbodiimide, di-2,6-diisopropylphenylcarbodiimide, di-2,6-di-tert-butylphenylcarbodiimide, N-tolyl-N'-phenylcarbodiimide, N-(2,6-diisopropyl-4-phenoxyphenyl)-N-tert-butylcarbodiimide, N,N-bis[3-isocyanato-2,4,6-tris(1-methylethyl)phenylamino]carbodiimide, N-cyclohexyl-N-(4-(dimethylamino)naphthyl)carbodiimide, di-o-tolylcarbodiimide, di-p-tolylcarbodiimide, di-p-nitrophenylcarbodiimide, di-p-aminophenylcarbodiimide, di-p-hydroxyphenylcarbodiimide, di-p-chlorophenylcarbodiimide, di-p-methoxyphenylcarbodiimide, di-3,4-dichlorophenylcarbodiimide, di-2,5-dichlorophenylcarbodiimide, di-o-chlorophenylcarbodiimide, di-2,4,6-trimethylphenylcarbodiimide, di-2,4,6-triisopropylphenylcarbodiimide, di-2,4,6-triisobutylphenylcarbodiimide, p-phenylene-bis-di-o-tolylcarbodiimide, p-phenylene-bis-dicyclohexylcarbodiimide, p-phenylene-bis-di-p-chlorophenylcarbodiimide, and ethylene-bis-diphenylcarbodiimide; and poly(4,4'-diphenylmethanecarbodiimide), poly(p-phenylenecarbodiimide), poly(m-phenylenecarbodiimide), poly(3,3'-dimethyl-4,4'-diphenylmethanecarbodiimide), poly(naphthylenecarbodiimide), poly(1,3-diisopropylphenylenecarbodiimide), poly(l-methyl-3,5-diisopropylphenylenecarbodiimide), poly(1,3,5-triethylphenylenecarbodiimide), poly(diisopropylphenylenecarbodiimide), and poly(triisopropylphenylenecarbodiimide). The above-mentioned carbodiimide compounds may be used in combination of two or more thereof. In particular, preferred are di-2,6-dimethylphenylcarbodiimide, poly(4,4'-diphenylmethanecarbodiimide), poly(phenylenecarbodiimide), and poly(triisopropylphenylenecarbodiimide).

In the present invention, the term "carbodiimide compound" (such as alicyclic carbodiimide compound or aromatic carbodiimide compound) does not include compounds having carbodiimido groups in the cyclic structures, i.e., compounds having "carbodiimide ring" (also called "cyclic carbodiimide compounds").

The carbodiimide compound (B) preferably has a number-average molecular weight of 2000 or more. The use of the carbodiimide compound (B) having a number-average molecular weight of 2000 or more can improve the hydrolysis resistance of the polybutylene terephthalate resin composition for a long time. Furthermore, even if the residence time in the melting and kneading or the molding of the polybutylene terephthalate resin composition is long, occurrence of a gas or smell can be advantageously reduced.

The content of the carbodiimide compound (B) in the polybutylene terephthalate resin composition is preferably such that the amount of carbodiimide functional groups is 0.5 to 10 equivalents, in case the amount of a terminal carboxyl group of the polybutylene terephthalate resin (A) is 1 equivalent. The hydrolysis resistance of the polybutylene terephthalate resin composition can be sufficiently increased within the above-mentioned range of the amount of the carbodiimide compound (B).

A too small amount of the carbodiimide compound (B) has a risk of failing to sufficiently improve the hydrolysis resistance as the object of the present invention. A too large amount of the carbodiimide compound (B) may easily cause a reduction in fluidity of the resin composition, generation of a gel component or a carbide during compounding or molding, a change in color in high temperature environment, or a reduction in mechanical characteristics. The content of the carbodiimide compound (B) is more preferably such that the amount of the carbodiimide functional groups is 0.8 to 5 equivalents, most preferably 1 to 3 equivalents, in case the amount of a terminal carboxyl group of the polybutylene terephthalate resin (A) is 1 equivalent. When the amount of the carbodiimide functional groups is 0.8 to 5 equivalents, a polybutylene terephthalate resin composition showing high fluidity during molding and excellent mechanical characteristics after the molding can be provided. Furthermore, when the amount of the carbodiimide functional groups is 1 to 3 equivalents, a polybutylene terephthalate resin composition prevented from changing in color in high temperature environment, in addition to showing high fluidity during molding and excellent mechanical characteristics after the molding, can be provided.

[Polyhydroxy Group-Containing Compound (C)]

The polyhydroxy group-containing compound (C) is a compound having two or more hydroxy groups in one molecule. The polyhydroxy group-containing compound (C) has a hydroxyl group value of 200 or more, as described below.

The polyhydroxy group-containing compound (C) functions as a hydrolysis resistance-improving agent that increases the hydrolysis resistance of the polybutylene terephthalate resin composition containing the carbodiimide compound (B).

The polyhydroxy group-containing compound (C) also increases the fluidity of the polybutylene terephthalate resin composition. In general, addition of a fluidity increasing component to a polybutylene terephthalate resin (A) can improve the fluidity, but cannot avoid a reduction in characteristics, such as mechanical strength and toughness, of the polybutylene terephthalate resin (A) itself. The use of the polyhydroxy group-containing compound (C), however, can efficiently increase the fluidity of the polybutylene terephthalate resin composition in a molten state while maintaining the characteristics of the polybutylene terephthalate resin (A) at high levels.

Accordingly, the polybutylene terephthalate resin composition containing the polyhydroxy group-containing compound (C) can utilize the characteristics of the polybutylene terephthalate resin and also can increase the hydrolysis resistance of the polybutylene terephthalate resin composition while increasing the fluidity of the resin composition.

As the fluidity of the polybutylene terephthalate resin composition, the melting viscosity is preferably 350 Pa·s or less, more preferably 300 Pa·s or less, and most preferably 250 Pa·s or less (for example, 200 Pa·s or less) measured in accordance with ISO 11443 with a capillary of 1 mm diameter and 20 mm length at a furnace temperature of 260° C. and a shear rate of 1000 sec$^{-1}$.

The polyhydroxy group-containing compound (C) may be produced by a known method or may be a commercially available one.

The polyhydroxy group-containing compound (C) has a hydroxyl group value of 200 or more. The hydroxyl group value is preferably 250 or more. A hydroxyl group value of 200 or more tends to further enhance the effect of increasing the fluidity and also has an effect of increasing the hydrolysis resistance. Meanwhile, a too large hydroxyl group value causes excessive proceeding of the reaction with the polybutylene terephthalate (A) to reduce the molecular weight of the polybutylene terephthalate resin (A) and may impair the excellent characteristics such as mechanical characteristics, heat resistance, and chemical resistance. The hydroxyl group value is preferably 1000 or less and more preferably 500 or less.

The content of the polyhydroxy group-containing compound (C) in the polybutylene terephthalate resin composition is preferably 0.05 parts by mass or more and 5 parts by mass or less, more preferably 0.1 parts by mass or more and 3 parts by mass or less, and most preferably 0.5 parts by mass or more and 2 parts by mass or less, based on 100 parts by mass of the polybutylene terephthalate resin (A). A content of the polyhydroxy group-containing compound of 0.05 parts by mass or more tends to sufficiently increase the fluidity and is therefore preferred. A content of 5 parts by mass or less does not have a substantial risk of causing a poor appearance of the molded article and contamination of the mold due to occurrence of gas during molding and is therefore preferred.

The polyhydroxy group-containing compound (C) is preferably a glycerin fatty acid ester or an ether prepared by addition polymerization of an alkylene oxide to diglycerin, from the viewpoint of imparting fluidity to the polybutylene terephthalate resin composition in a molten state and not substantially decreasing the physical properties of the polybutylene terephthalate resin (A) in the resulting molded article. The glycerin fatty acid ester and the ether prepared by addition polymerization of an alkylene oxide to diglycerin will now be described.

The glycerin fatty acid ester is an ester composed of glycerin and/or its dehydration condensate and a fatty acid. The fatty acid of the glycerin fatty acid ester preferably has 12 or more carbon atoms. Examples of the fatty acid having 12 or more carbon atoms include lauric acid, oleic acid, palmitic acid, stearic acid, 12-hydroxystearic acid, behenic acid, and montanoic acid. The fatty acid preferably has 12 to 32 carbon atoms and most preferably 12 to 22 carbon atoms. Specifically, lauric acid, stearic acid, 12-hydroxystearic acid, and behenic acid are particularly preferred. The use of a fatty acid having 12 or more carbon atoms tends to sufficiently maintain the heat resistance of the resin and is therefore preferred. A fatty acid having 32 or less of carbon atoms has a high effect of increasing the fluidity and is therefore preferred.

Preferred examples of the glycerin fatty acid ester include glycerin monostearate, glycerin monobehenate, diglycerin monostearate, triglycerin monostearate, triglycerin stearic acid partial esters, tetraglycerin stearic acid partial esters, decaglycerin lauric acid partial esters, and glycerin mono-12-hydroxy stearate.

Examples of the ether prepared by addition polymerization of an alkylene oxide to diglycerin include polyoxypropylene diglyceryl ether prepared by addition polymerization of propylene oxide to diglycerin and polyoxyethylene diglyceryl ether prepared by addition polymerization of ethylene oxide to diglycerin. In the present invention, the polyoxyethylene diglyceryl ether is particularly preferred.

[Inorganic Filler (D)]

The polybutylene terephthalate resin composition of the present invention preferably contains an inorganic filler. The resulting molded article can have further enhanced physical properties, such as mechanical strength, by containing the inorganic filler.

The inorganic filler (D) may be, for example, a fibrous filler, a granular filler, or a tabular filler. Examples of the fibrous filler include inorganic fibrous materials such as glass fibers, asbestos fibers, silica fibers, silica-alumina fibers, alumina fibers, zirconia fibers, boron nitride fibers, silica nitride fibers, boron fibers, potassium titanate fibers, and fibrous materials of metals such as stainless steel, aluminum, titanium, copper, and brass. Examples of the granular filler include silica, quartz powder, glass beads, milled glass fibers, glass balloons, glass powder, calcium silicate, aluminum silicate, kaolin, talc, clay, diatomaceous earth, silicates such as wallastonite, metal oxides such as iron oxide, titanium oxide, zinc oxide, antimony trioxide, and alumina, metal carbonates such as calcium carbonate and magnesium carbonate, metal sulfates such as calcium sulfate and barium sulfate, ferrite, silicon carbide, silicon nitride, boron nitride, and various metal powders. Examples of the tabular filler include mica, glass flakes, and foils of various metals.

Appropriate type and amount of the inorganic filler (D) are preferably adjusted depending on, for example, the types of the compounds contained in the mixture. The amount of the inorganic filler (D) is, for example, 10 parts by mass or more and 200 parts by mass or less based on 100 parts by mass of the polybutylene terephthalate resin (A).

[Other Components]

The resin composition of the present invention can contain another resin or a known additive, such as a reinforcing filler, a flame retardant, an antioxidant, a heat resistant stabilizer, a UV absorber, an antistatic agent, a coloring agent such as a dye or a pigment, a lubricant, a plasticizer, or a nucleating agent, within a range that does not impair the effects of the present invention. In the present invention, it is preferable in some cases that the resin composition of the present invention contain a transesterification catalyst or a transesterification terminator as an additional component.

In the composition containing a transesterification catalyst, the reaction between the polybutylene terephthalate resin (A) and the polyhydroxy group-containing compound (C) is enhanced. When the reaction between the polybutylene terephthalate resin (A) and the polyhydroxy group-containing compound (C) is slow and takes a long time to achieve desired fluidity, the desired fluidity can be rapidly achieved by using a transesterification catalyst.

Any transesterification catalyst can be used. For example, a metal compound can be used as the transesterification catalyst. In particular, preferably used are titanium compounds, tin compounds, and antimony compounds. Typical examples of the titanium compound include inorganic titanium compounds such as titanium oxide; titanium alcoholates such as tetramethyl titanate, tetraisopropyl titanate, and tetrabutyl titanate; and titanium phenolates such as tetraphenyl titanate. Examples of the tin compound include dibutyl tin oxide, hexaethylditin oxide, didodecyltin oxide, triethyltin hydroxide, tributyltin acetate, dibutyltin diacetate, diphenyltin dilaurate, monobutyltin trichloride, methylstannoic acid, ethylstannoic acid, and butylstannoic acid. Examples of the antimony compound include antimony trioxide. In particular, preferably used are tetrabutyl titanate, tributyltin acetate, and antimony trioxide.

Excessive transesterification has a risk of reducing the physical properties of the molded article of the resin composition. The use of the transesterification terminator can achieve desired fluidity without causing problems such as a reduction in physical properties.

As the transesterification terminator, a phosphorus compound can be preferably used. The type and the amount of the phosphorus compound are not particularly limited and can be appropriately adjusted depending on the conditions such as the types of the compounds contained in the composition of the present invention.

Any phosphorus compound can be used, and usable examples thereof include phosphine-based, phosphinite-based, phosphonite-based, phosphite-based, phosphinous amide-based, phosphonous diamide-based, phosphorous triamide-based, phosphoramidate-based, phosphorodiamidate-based, phosphine oxide-based, phosphinate-based, phosphonate-based, phosphate-based, phosphinic amide-based, phosphonodiamidate-based, phosphoramide-based, phosphoramidate-based, phosphorodiamidate-based, phosphineimide-based, and phosphine sulfide-based phosphorus compounds. Examples of the phosphorus compound also include salts with metals.

[Method of Producing Polybutylene Terephthalate Resin Composition]

The polybutylene terephthalate resin composition of the present invention may be prepared by any method and can be produced at existing facilities by a known method for generally preparing resin compositions. For example, the polybutylene terephthalate resin composition can be prepared as a pellet for molding by mixing necessary components and kneading the mixture with a single- or twin-screw extruder or another melt-kneading apparatus. The kneading may be performed with a plurality of extruders or other melt-kneading apparatuses. All components may be simultaneously fed from a hopper. Alternatively, a part of the components may be fed from a side feed opening. The cylinder temperature of the extruder is preferably controlled such that the resin temperature in the extruder is 240° C. to 300° C. The resin temperature is more preferably 250° C. to 270° C. A resin temperature of lower than 240° C. has a risk of causing an insufficient reaction between the polybutylene terephthalate resin (A) and the carbodiimide compound (B), resulting in a shortage of hydrolysis resistance of the resin composition or a risk of causing insufficient kneading due to the high viscosity of the molten material, resulting in a failure of providing a resin composition having uniform characteristics. Meanwhile, a resin temperature of higher than 300° C. has a risk of easily causing decomposition of the resin, resulting in a shortage of the mechanical properties and hydrolysis resistance of the resin composition.

The composition of the present invention may be produced by melt-kneading the polybutylene terephthalate resin (A) and the polyhydroxy group-containing compound (C) in advance and then adding the carbodiimide compound (B) to the mixture. In such a case, the carbodiimide compound (B) is added to the polybutylene terephthalate resin (A) having a reduced melting viscosity. Consequently, uniform melt-kneading can be efficiently performed. In contrast, when the polybutylene terephthalate resin (A) and the carbodiimide compound (B) are melt-kneaded in advance and the polyhydroxy group-containing compound (C) is then added to the mixture, the viscosity of the polybutylene terephthalate (A) is increased by the reaction between the polybutylene terephthalate resin (A) and the carbodiimide compound (B). The increased viscosity prevents sufficient melt-kneading with the polyhydroxy group-containing compound (C) and furthermore increases the heat generation due to shear, leading to a risk of thermal decomposition of the polybutylene terephthalate resin (A). Similarly also in the polybutylene terephthalate resin composition containing the inorganic filler (D), when the polybutylene terephthalate resin (A) and the polyhydroxy group-containing compound (C) are melt-kneaded in advance and the inorganic filler (D) is added to the mixture, the inorganic filler (D) is prevented from breakage and does not impair the physical properties. Accordingly, in the case of using a fibrous filler, a method in which the polybutylene terephthalate resin (A) and the polyhydroxy group-containing compound (C) are melt-kneaded in advance is particularly preferred. In addition, the interface adhesiveness between the polybutylene terephthalate resin (A) and the inorganic filler (D) can be further strengthened by the addition of the inorganic filler (D) prior to the addition of the carbodiimide compound (B). Thus, such an order is preferred.

Alternatively, the carbodiimide compound (B) can be mixed as a master batch with a matrix of the resin. The actual handling by using a master batch is easy in many cases. Although a master batch of a polybutylene terephthalate resin is suitable, a master batch of another resin may be used. In a master batch of the polybutylene terephthalate resin, the mixing amount may be adjusted within a predetermined range.

EXAMPLES

The present invention will now be described in more detail by examples, but is not limited to the following examples.
Materials
Polybutylene Terephthalate Resin (A)

A-1: polybutylene terephthalate resin (intrinsic viscosity: 0.68 dL/g, terminal carboxyl group amount: 27 meq/kg, manufactured by WinTech Polymer Ltd.)

A-2: polybutylene terephthalate resin (intrinsic viscosity: 0.87 dL/g, terminal carboxyl group amount: 16 meg/kg, manufactured by WinTech Polymer Ltd.)

A-3: polybutylene terephthalate resin (intrinsic viscosity: 1.14 dL/g, terminal carboxyl group amount: 12 meq/kg, manufactured by WinTech Polymer Ltd.) Carbodiimide compound (B)

B-1: Stabaxol P400, manufactured by Rhein Chemie Japan Ltd.
Polyhydroxy Group-Containing Compound (C)

C-1: triglycerin stearic acid partial ester (hydroxyl group value: 280, "Rikemal AF-70", manufactured by Riken Vitamin Co., Ltd.)

C-2: pentaerythritol tetrastearate (hydroxyl group value: 11, "Loxiol VPG861", manufactured by Cognis Japan Ltd.)

The hydroxyl group value of the polyhydroxy group-containing compound (C) was measured by the method of the Japan Oil Chemists' Society 2.3.6.2-1996 hydroxyl value (pyridine-acetic anhydride method).

Examples 1 to 3 and Comparative Examples 1 to 10

The polybutylene terephthalate resin (A), the carbodiimide compound (B), and the polyhydroxy group-containing compound (C) were weighed at formulations shown in Table 1. Each mixture was dry-mixed and was melt-kneaded with a twin-screw extruder (TEX-30, manufactured by the Japan Steel Works, Ltd.) at a cylinder temperature of 260° C., a screw rotation speed of 130 rpm, and an extrusion rate of 12 kg/h. The extruded strands of the molten resin were cooled and were cut with a pelletizer to give pellet samples of the resin composition. Subsequently, the pellets were subjected to the following evaluations.
[Terminal Carboxyl Group Amount (CEG)]

The terminal carboxyl group amount was determined by dissolving the pulverized sample of the resin composition pellet of the present invention in benzyl alcohol at 215° C. for 10 minutes and titrating the solution with a 0.01 N sodium hydroxide aqueous solution. The results are shown in Table 1.
[Melting Viscosity (MV) Characteristics]

The resin composition pellet of the present invention was dried at 140° C. for 3 hours, and the melting viscosity was measured in accordance with ISO 11443 using Chapillograph 18 (manufactured by Toyo Seiki Seisaku-sho, Ltd.) at a furnace temperature of 260° C. with a capillary of 1 mm diameter and 20 mm length and a shear rate of 1000 $sec^{-1}$. The results are shown in Table 1.
[Tensile Strength (TS)]

The resin composition pellet of the present invention was dried at 140° C. for 3 hours and was then injection-molded into an ISO 3167 tensile strength test piece at a resin temperature of 260° C. and a mold temperature of 80° C. for an injection time of 15 seconds and a cooling time of 15 seconds. The tensile strength was measured in accordance with ISO 527-1 and -2. The results are shown in Table 1.
[Pressure Cooker Test (PCT)]

The test piece subjected to the tensile strength test was treated with a pressure cooker tester under conditions of a temperature of 121° C. and a relative humidity of 100%. The tensile strength after the treatment was measured to determine the tensile strength retentions before and after the treatment. The treatment times and the results of the test are shown in Table 1. The approximate curves of Examples and Comparative Examples were obtained based on the dots representing the measurement results in Examples and Comparative Examples plotted on the graph showing the TS retention on the vertical axis and the treatment time on the horizontal axis. The treatment time showing a TS retention of 80% in each approximate curve is shown in Table 1. FIG. 1 shows the approximate curves of an example (Example 2) and comparative examples (Comparative Examples 2, 5, 8, and 10) in which A-2 was used as the PBT. The arrows in the graph show the treatment times at which the TS retention was 80%.

The TS retentions were calculated by the following expression:

TS retention (unit: %)=(TS after treatment for a prescribed time/TS before the treatment)×100

TABLE 1

|  | | Example | | | | | | | Comparative Example | | | | | | | | | |
|---|---|---|---|---|---|---|---|---|---|---|---|---|---|---|---|---|---|---|
|  | | 1 | 2 | 3 | 4 | 5 | 6 | 7 | 1 | 2 | 3 | 4 | 5 | 6 | 7 | 8 | 9 | 10 |
| A-1 | | 100 | | | | | | | 100 | | | 100 | | | 100 | | | |
| A-2 | | | 100 | | 100 | 100 | 100 | 100 | | 100 | | | 100 | | | 100 | | 100 |

TABLE 1-continued

| | Example | | | | | | | Comparative Example | | | | | | | | | |
|---|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 | 10 |
| A-3 | | | 100 | | | | | | | 100 | | | 100 | | | 100 | |
| B-1 | 0.7 | 0.7 | 0.7 | 0.1 | 1.5 | 0.7 | 0.7 | | | | 0.7 | 0.7 | 0.7 | | | | 0.7 |
| C-1 | 1 | 1 | 1 | 1 | 1 | 0.5 | 2 | | | | | | | 1 | 1 | 1 | |
| C-2 | | | | | | | | | | | | | | | | | 1 |
| Equivalent ratio | 1 | 1.9 | 2.8 | 0.3 | 4.0 | 1.9 | 1.9 | | | | 1 | 1.9 | 2.8 | | | | 1.9 |
| CEG(meq/kg) | 6 | 3 | 2 | 7 | 2 | 6 | 4 | 27 | 17 | 14 | 12 | 7 | 3 | 29 | 17 | 14 | 7 |
| MV(Pa·s) | 70 | 160 | 230 | 100 | 150 | 190 | 80 | 60 | 160 | 300 | 100 | 240 | 390 | 40 | 110 | 200 | 230 |
| TS(MPa) | 60 | 58 | 56 | 57 | 58 | 59 | 54 | 61 | 58 | 55 | 60 | 57 | 55 | 60 | 57 | 53 | 56 |
| 80% TS retention time after PCT treatment (hr) | 64 | 160 | >200 | 60 | >200 | 142 | 132 | 26 | 53 | 62 | 64 | 135 | 151 | 31 | 55 | 64 | 135 |
| TS retention after PCT (%) 24 hr | 97.1 | 96.8 | 96.1 | 100.7 | 95.7 | 96.9 | 98.7 | 85.2 | 99.6 | 100.5 | 97.9 | 97.2 | 97.3 | 92.6 | 101.6 | 100.3 | 98.9 |
| 48 hr | 97.1 | 97.6 | 96.2 | 101.2 | 96.2 | 98.0 | 99.1 | 30.4 | 92.2 | 104.8 | 99.5 | 98.4 | 98.0 | 46.9 | 99.2 | 103.6 | 100.2 |
| 72 hr | 63.2 | 99.6 | 98.5 | 58.1 | 97.3 | 100.2 | 101.3 | 0.7 | 31.1 | 57.8 | 62.6 | 102.1 | 101.5 | 2.1 | 28.0 | 55.3 | 103.3 |
| 96 hr | 29.9 | 100.3 | 99.0 | 22.0 | 98.5 | 100.2 | 102.8 | — | 2.9 | 24.0 | 29.5 | 104.1 | 103.1 | — | 2.6 | 22.4 | 104.9 |
| 120 hr | 1.2 | 101.9 | 100.0 | — | 100.4 | 102.5 | 103.5 | — | — | — | — | 106.3 | 104.4 | — | — | — | 106.5 |
| 144 hr | — | 87.0 | 98.2 | — | 101.6 | 78.8 | 55.1 | — | — | — | — | 63.8 | 92.3 | — | — | — | 64.1 |
| 168 hr | — | 61.3 | 101.2 | — | 101.4 | 42.4 | 3.4 | — | — | — | — | 22.7 | 65.3 | — | — | — | 24.1 |
| 192 hr | — | 33.0 | 100.8 | — | 100.5 | 21.3 | — | — | — | — | — | 0.4 | 27.7 | — | — | — | 0.9 |

The retention shown as "—" means that the test sample was broken at the time of being fastened for being fixed to a measuring machine and the measurement was impossible.

The results of Examples and Comparative Examples demonstrate that the present invention can provide polybutylene terephthalate resin compositions having excellent hydrolysis resistance and also high fluidity in a molten state.

In Example 5 in which the equivalent ratio is "4.0", the test piece after the PCT treatment had a slight change in color. In Example 5, however, the melting viscosity characteristics and the TS retention were sufficiently excellent.

What is claimed is:

1. A polybutylene terephthalate resin composition comprising:
    a polybutylene terephthalate resin (A) having a terminal carboxyl group amount in a range of 12 to 16 meq/kg;
    a non-cyclic carbodiimide compound (B) wherein the content of the non-cyclic carbodiimide compound (B) in the polybutylene terephthalate resin composition is 0.7 to 1.5 parts by mass based on 100 parts by mass of the polybutylene terephthalate resin (A);
    a polyhydroxy group-containing compound (C) having a hydroxyl group value of 200 mgKOH/g or more, wherein the polyhydroxy group-containing compound (C) is ester composed of glycerin and/or its dehydration condensate and a fatty acid having 12 or more carbon atoms, wherein the fatty acid having 12 or more carbon atoms is at least one selected from lauric acid, oleic acid, palmitic acid, stearic acid, 12-hydroxystearic acid, behenic acid, and montanoic acid, wherein the content of the polyhydroxy group-containing compound (C) in the polybutylene terephthalate resin composition is 0.5 to 1.0 parts by mass based on 100 parts by mass of the polybutylene terephthalate resin (A); and the non-cyclic carbodiimide compound is poly(triisopropylphenylenecarbodiimide).

2. The polybutylene terephthalate resin composition according to claim 1, wherein the polybutylene terephthalate resin (A) has an intrinsic viscosity of 0.6 dL/g or more.

3. The polybutylene terephthalate resin composition according to claim 1, wherein, in case the amount of a terminal carboxyl group of the polybutylene terephthalate resin (A) is 1 equivalent, the amount of the carbodiimide compound (B) is contained in the polybutylene terephthalate resin composition such that the amount of the carbodiimide functional groups is 0.5 to 10 equivalents.

4. The polybutylene terephthalate resin composition according to claim 1, further comprising:
    an inorganic filler (D).

5. The polybutylene terephthalate resin composition according to claim 1, wherein the polyhydroxy group-containing compound (C) has an ester bond with stearic acid.

* * * * *